United States Patent
Kleczek et al.

(10) Patent No.: US 12,129,364 B2
(45) Date of Patent: Oct. 29, 2024

(54) FILMS FROM RECYCLED POLYETHYLENE

(71) Applicant: NOVA Chemicals (International) S.A., Fribourg (CH)

(72) Inventors: Monika Kleczek, Calgary (CA); John Bayley, Calgary (CA)

(73) Assignee: NOVA Chemicals (International) S.A., Fribourg (CH)

( * ) Notice: Subject to any disclaimer, the term of this patent is extended or adjusted under 35 U.S.C. 154(b) by 305 days.

(21) Appl. No.: 17/611,108

(22) PCT Filed: May 1, 2020

(86) PCT No.: PCT/IB2020/054135
§ 371 (c)(1),
(2) Date: Nov. 12, 2021

(87) PCT Pub. No.: WO2020/229932
PCT Pub. Date: Nov. 19, 2020

(65) Prior Publication Data
US 2022/0227977 A1   Jul. 21, 2022

Related U.S. Application Data (60) Provisional application No. 62/846,792, filed on May 13, 2019.

(51) Int. Cl.
| | |
|---|---|
| *C08L 23/06* | (2006.01) |
| *B32B 27/08* | (2006.01) |
| *B32B 27/32* | (2006.01) |
| *C08J 5/18* | (2006.01) |

(52) U.S. Cl.
CPC .............. *C08L 23/06* (2013.01); *B32B 27/08* (2013.01); *B32B 27/32* (2013.01); *C08J 5/18* (2013.01); *B32B 2250/242* (2013.01); *B32B 2272/00* (2013.01); *B32B 2307/54* (2013.01); *B32B 2307/72* (2013.01); *B32B 2307/732* (2013.01); *B32B 2307/736* (2013.01); *B32B 2553/00* (2013.01); *C08J 2323/06* (2013.01); *C08J 2423/06* (2013.01); *C08L 2207/20* (2013.01)

(58) Field of Classification Search
None
See application file for complete search history.

(56) References Cited

FOREIGN PATENT DOCUMENTS

| | | | |
|---|---|---|---|
| CN | 102001169 A | * | 4/2011 |
| EP | 1524108 A1 | * 4/2005 | .............. B32B 1/08 |
| EP | 3 483 206 A1 | 5/2019 | |
| GB | 2 218 997 A | 11/1989 | |
| WO | WO-91/17886 | 11/1991 | |

OTHER PUBLICATIONS

Machine translation of CN 102001169 A. (Year: 2011).*
Machine translation of EP 1524108 A1. (Year: 2005).*
Al-Salem et al, Study of the degradation profile for virgin linear low-density polyethylene (LLDPE) and polyolefin (PO) plastic waste blends, Journal of Material Cycles and Waste Management, Springer Japan, Tokyo, vol. 21, No. 5, May 4, 2019, pp. 1106-1122, XZP036871570. p. 1108 (Abstract only).
ASTM D1003-13, Standard Test Method for Haze and Luminous Transmittance of Transparent Plastics, ASTM Int'l 2013.
ASTM D1238-13, Standard Test Method for Melt Flow Rates of Thermoplastics by Extrusion Plastometer, ASTM Int'l 2013.
ASTM D1709-09, Standard Test Methods for Impact Resistance of Plastic Film by the Free-Falling Dart Method, ASTM Int'l 2009.
ASTM D1922-09, Standard Test Method for Propagation Tear Resistance of Plastic Film and Thin Sheeting by Pendulum Method, ASTM Int'l 2009.
ASTM D2457-13, Standard Test Method for Specular Gloss of Plastic Films and Solid Plastics, ASTM Int'l 2013.
ASTM D792-13, Standard Test Methods for Density and Specific Gravity (Relative Density) of Plastics by Displacement, ASTM Int'l 2013.
ASTM D882-12, Standard Test Method for Tensile Properties of Thin Plastic Sheeting, ASTM Int'l 2012.
Carreau-Yasuda model, K. Yasuda PhD Thesis, IT Cambridge (1979).
PCT/IB2020/054135, International Search Report mailed Aug. 3, 2020.
R.B. Bird et al, Dynamics of Polymer Liquids. vol. 1: Fluid Mechanics, Wiley-Interscience Publications (1987) p. 228.
ASTM D3418-15, Standard Test Method for Transition Temperatures and Enthalpies of Fusion and Crystallization of Polymers by Differential Scanning Calorimetry, ASTM Int'l 2015.

* cited by examiner

*Primary Examiner* — Ramsey Zacharia
(74) *Attorney, Agent, or Firm* — Thomas J. Styslinger (57) ABSTRACT

Large volumes of recycled polyethylenes are available for reuse. It would be desirable to prepare films from recycled polyethylene, however, the technical demands for many types of films can make this very difficult. Provided herein are films, for example, stretch films; shrink films; films for vacuum packages and films for dunnage packaging, that may be prepared from a blend of recycled polyethylene with "virgin" polyethylene.

25 Claims, 2 Drawing Sheets

FILMS FROM RECYCLED POLYETHYLENE

CROSS-REFERENCE TO RELATED PATENT APPLICATIONS

This application is a U.S. National Phase Application under 35 U.S.C. § 371 of International Application No. PCT/IB2020/054135, filed May 1, 2020, which claims the benefit of priority to U.S. Provisional Application No. 62/846,792, filed on May 13, 2019, both of which are incorporated herein by reference in their entirety.

TECHNICAL FIELD

This disclosure relates to films made with blends of recycled polyethylene and "virgin" polyethylene.

BACKGROUND ART

Polyethylene is the most common plastic sold in the world today. Many of the goods made with polyethylene are intended for single use, with the result that large volumes of waste polyethylene are generated. It is known to recover and recycle some of this waste, but the need exists for further recycling technologies.

Provided herein are films made from a recycled polyethylene composition comprising from 95 to 10 weight % polyethylene and 5 to 90 weight % of recycled polyethylene.

SUMMARY OF INVENTION

In an embodiment, there is provided a stretch film made with a blend of polyethylene and recycled polyethylene.

In an embodiment, there is provided a multilayer stretch film made with recycled polyethylene in the core.

In an embodiment, there is provided a shrink film made with a blend of polyethylene and recycled polyethylene.

In an embodiment, there is provided a film made from a blend of polyethylene and recycled polyethylene that is suitable for use in vacuum packaging.

In an embodiment, there is provided a film made from a blend of polyethylene and recycled polyethylene that is suitable for the preparation of dunnage.

In an embodiment, the films disclosed herein contain from 1 to 80, or for example, from 10 to 50 weight % of recycled polyethylene based on the total amount of polyethylene and a density of from 0.88 to 0.97 grams per cubic centimeter.

In an embodiment, the recycled polyethylene used in these blends contain from 1 to 80, or for example, from 10 to 50 weight % of recycled polyethylene based on the total amount of polyethylene and a density of from 0.88 to 0.97 grams per cubic centimeter.

In an embodiment, the polyethylene (or "virgin" polyethylene) used in these blends has a melt index, I2, of from 0.3 to 30 grams/10 minutes, or for example from 0.3 to 10, more particularly from 0.5 to 5 grams/10 minutes.

DESCRIPTION OF EMBODIMENTS

Other than in the operating examples or where otherwise indicated, all numbers or expressions referring to quantities of ingredients, reaction conditions, etc. used in the specification and claims are to be understood as modified in all instances by the term "about". Accordingly, unless indicated to the contrary, the numerical parameters set forth in the following specification and attached claims are approximations that can vary depending upon the desired properties, which the present invention desires to obtain. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical values, however, inherently contain certain errors necessarily resulting from the standard deviation found in their respective testing measurements.

Also, it should be understood that any numerical range recited herein is intended to include all sub-ranges subsumed therein. For example, a range of "1 to 10" is intended to include all sub-ranges between and including the recited minimum value of 1 and the recited maximum value of 10; that is, having a minimum value equal to or greater than 1 and a maximum value of equal to or less than 10. Because the disclosed numerical ranges are continuous, they include every value between the minimum and maximum values. Unless expressly indicated otherwise, the various numerical ranges specified in this application are approximations.

Virgin Polyethylene(s) (Also Known as, or Referred to as, Polyethylene(s), Ethylene Polymer(s) or Ethylene Interpolymer(s))

As used herein, the term "HDPE" refers to high density polyethylene, which generally has a density of greater or equal to 0.941 g/cm$^3$, or for example, from 0.941 to 0.97 g/cm$^3$. HDPE has a low degree of branching. HDPE may be produced using chromium/silica catalysts, Ziegler-Natta catalysts or metallocene catalysts. HDPE, and the other polyethylenes described herein, typically contain additives. Additives are discussed in the section on recycled polyethylene herein below.

As used herein, the term "LDPE" refers to low density polyethylene, which is a polyethylene with a high degree of branching with long chains. Often, the density of a LDPE will range from 0.910-0.940 g/cm$^3$. LDPE is created by free radical polymerization under conditions of high ethylene pressure.

As used herein, the term "LLDPE" refers to linear low density polyethylene, which is a polyethylene with significant numbers of short branches resulting from copolymerization of ethylene with at least one $C_{3-12}$ α-olefin comonomer, e.g., butene, hexene or octene. Typically, LLDPE has a density in the range of 0.915-0.925 g/cm$^3$. In some embodiments, the LLDPE is an ethylene hexene copolymer, or an ethylene octene copolymer, or an ethylene butene copolymer. The amount of comonomer incorporated can be from 0.5 to 12 mole %, or in some embodiments from 1.5 to 10 mole %, and in other embodiments from 2 to 8 mole % relative to ethylene. LLDPE may be produced using a wide variety of catalysts, including Ziegler Natta catalysts and single site/metallocene catalysts, and in a wide variety of processes, including gas phase, slurry and solution processes.

As used herein, the term "MDPE" refers to medium density polyethylene, which is a polyethylene with some branching and a density in the range of 0.926-0.940 g/cm$^3$.

MDPE can be produced using chromium/silica catalysts, Ziegler-Natta catalysts or single site/metallocene catalysts and in a wide variety of processes, including gas phase, slurry and solution processes.

As used herein, the term "VLDPE" refers to very low density polyethylene, which is a polyethylene with high levels of short chain branching with a typical density in the range of 0.88-0.915 g/cc. In some embodiments, VLDPE is a substantially linear polymer. VLDPE is typically produced by copolymerization of ethylene with short-chain alpha-olefins (e.g., 1-butene, 1-hexene, or 1-octene). VLDPE is most commonly produced using metallocene catalysts in a solution process.

"Virgin" polyethylene as used herein is polyethylene that has not been converted into a finished product. The word "virgin" is redundant in most instances but is used herein when it helps to distinguish as-manufactured polyethylene pellets from recycled polyethylene pellets.

Recycled Polyethylene

The term "recycled polyethylene" as used herein refers to polyethylene that has been exposed to at least one heat history. It will be appreciated by those skilled in the art that polyethylene is typically converted into finished goods in processes that involve melting the polyethylene and then forming it into the finished good. The melting process is referred to as a "heat history".

Recycled plastic may have been recovered or otherwise diverted from the solid waste stream. Recycled materials diverted either during the manufacturing process or after the manufacturing process but before consumer use is sometimes referred to as post industrial resin, post industrial recycle, or PIR. Recycled materials recovered after consumer use is sometimes referred to as post consumer recycled resins, or PCR). The term "recycled" refers to both PIR and PCR. Either material, or blends of both, are suitable for use as disclosed herein.

Both PCR and PIR materials can be purchased commercially.

It will also be appreciated that another source of recycled polyethylene is from used polyethylene parts that are first cleaned, next melted in an extruder and then converted into pellets for sale. This source of recycled polyethylene may be exposed to at least two heat histories—one in the original conversion process and another in the process to prepare recycled polyethylene pellets.

Recycling processes where materials experience heat histories will generally cause the formation of free radicals and hydroperoxides in the polyethylene. Most polyethylene is sold with an antioxidant system that contains a primary antioxidant (designed to trap free radicals) and a secondary antioxidant (designed to quench hydroperoxides). Hindered phenols are commonly used as the primary antioxidant (e.g. IRGANOX® 1010 and IRGANOX 1076, sold by BASF) and hindered phosphites are commonly used as the secondary antioxidant (e.g. IRGAPHOS® 168).

These antioxidants may be oxidized during a heat history. It is known to measure the level of consumed antioxidants (oxidized antioxidants) in a polyethylene and to use this value of an indication of degradation, or the "wear and tear" that the polyethylene has been exposed to.

Recycled Polyethylene Compositions

As used herein the term "recycled polyethylene compositions" refers to compositions comprising a blend or mixture of recycled polyethylenes and virgin polymer, for example virgin polyethylene.

In some embodiments, the recycled polyethylene compositions provided herein include recycled polyethylene. The recycled polyethylene may be derived from any polyethylene recycling process, for example from post-industrial recycling, or from post consumer recycling. In some embodiments, the recycled polyethylene comprises a mixture of both post-consumer recycled polyethylene and post-industrial recycled polyethylene.

In some embodiments, the amount of recycled polyethylene present in the recycled polyethylene composition is in the range from about 0.1% to about 100% by weight of the recycled polyethylene composition. In some embodiments, the amount of recycled polyethylene present in the recycled polyethylene composition is in the range from about 5% to about 90% by weight of the recycled polyethylene composition. In one or more embodiments, the recycled polyethylene composition includes recycled polyethylene in an amount in the range from about 50% to about 99% by weight. In one or more embodiments, the recycled polyethylene composition may include recycled polyethylene in an amount in the range from about 20% to about 80% by weight. In one or more embodiments, the recycled polyethylene composition may include recycled polyethylene in an amount in the range from about 5% to about 20% by weight. In one or more embodiments, the recycled polyethylene composition may include recycled polyethylene in an amount in the range from about 20% to about 50% by weight. In one or more embodiments, the recycled polyethylene composition may include recycled polyethylene in an amount in the range from about 80% to about 90% by weight.

In some embodiments, the recycled polyethylene may be provided in any suitable form, such as in the form of chips, pellets, powders, slurries, solutions, and the like.

In some embodiments, the recycled polyethylene composition may also include one or more additive. Non limiting examples of additive include an antioxidant, slip agent, anti-static agent, impact modifier, colorant, acid scavenger, processing aid component, melt stabilizer, and nucleating agents. The antioxidant component may include one or more of hindered phenols and may optionally be present in an amount in up to about 2000 ppm by weight of the recycled polyethylene composition. The acid scavenger component may include one or more of calcium stearate, dihydro talcite, calcium lactate and monopotassium citrate. The colorant component may include organic dyes, inorganic pigments, carbon black, channel black and titanium dioxide. The processing aid component utilized in one or more embodiments may include one or more of a fatty acid ester, polyethylene glycol and fluoroelastomer.

Film Production

The extrusion-blown film process is a well-known process for the preparation of plastic film. The process employs an extruder which heats, melts and conveys the molten plastic (e.g., the polymer blend) and forces it through an annular die. Typical extrusion temperatures are from about 330 to about 500° F., or for example, about 350 to about 460° F.

The polyethylene film is drawn from the die and formed into a tube shape and eventually passed through a pair of draw or nip rollers. Internal compressed air is then introduced from a mandrel causing the tube to increase in diameter forming a "bubble" of the desired size. Thus, the blown film is stretched in two directions, namely in the axial direction (by the use of forced air which "blows out" the diameter of the bubble) and in the lengthwise direction of the bubble (by the action of a winding element which pulls the bubble through the machinery). External air is also introduced around the bubble circumference to cool the melt as it exits the die. Film width is varied by introducing more or less internal air into the bubble thus increasing or decreasing the bubble size. Film thickness is controlled primarily by increasing or decreasing the speed of the draw roll or nip roll to control the draw-down rate.

The bubble is then collapsed into two doubled layers of film immediately after passing through the draw or nip rolls. The cooled film can then be processed further by cutting or sealing to produce a variety of consumer products. While not wishing to be bound by theory, it is generally believed by those skilled in the art of manufacturing blown films that the physical properties of the finished films are influenced by both the molecular structure of a polyethylene copolymer and by the processing conditions. For example, the processing conditions are thought to influence the degree of molecular orientation (in both the machine direction and the axial or cross direction).

A balance of "machine direction" ("MD") and "transverse direction" ("TD"—which is perpendicular to MD) molecular orientation is generally considered desirable for the films associated with this disclosure (for example, Dart Impact strength, Machine Direction and Transverse Direction tear properties). Thus, it is recognized that these stretching forces on the "bubble" can affect the physical properties of the finished film. In particular, it is known that the "blow up ratio" (i.e. the ratio of the diameter of the blown bubble to the diameter of the annular die) can have a significant effect upon the dart impact strength and tear strength of the finished film.

The above description relates to the preparation of monolayer films. Multilayer films may be prepared by 1) a "co-extrusion" process that allows more than one stream of molten polymer to be introduced to an annular die resulting in a multi-layered film membrane; or 2) a lamination process in which film layers are laminated together.

In an embodiment, the films disclosed are prepared using the above described blown film process.

An alternative process is the so-called cast film process, wherein a polyethylene copolymer (or polymer blend) is melted in an extruder, then forced through a linear slot die, thereby "casting" a thin flat film. The extrusion temperature for cast film is typically somewhat hotter than that used in the blown film process (with typically operating temperatures of from about 450 to about 550° F.). In general, cast film is cooled (quenched) more rapidly than blown film.

In an embodiment, the films disclosed herein are prepared using a cast film process.

The films disclosed herein may be single layer or multiple layer films. The multiple layer films may comprise one or more layers formed from recycled polyethylene. The films may also have one or more additional layers formed from other materials such as other polymers, such as ethylene vinyl acetate, ethylene vinyl alcohol and the like.

Multiple layer films may be formed by methods well known in the art. If all layers are polymer, the polymers may be coextruded through a coextrusion feed block and die assembly to yield a film with two or more layers adhered together but differing in composition. Multiple layer films may also be formed by extrusion coating whereby a substrate material is contacted with the hot molten polymer as it exits the die.

Stretch Films

Stretch films are widely used in a variety of bundling and packaging applications. The term "stretch film" indicates films capable of stretching and applying an elastic bundling force, and includes films stretched at the time of application as well as "pre-stretched" films, i.e., films which are provided in a pre-stretched form for use without additional stretching. Stretch films can be monolayer films or multilayer films, and can include cling-enhancing additives such as tackifiers, and non-cling or slip additives, as desired, to tailor the slip/cling properties of the film. Typical polymers used in the cling layer of conventional stretch films include, for example, ethylene vinyl acetate, ethylene methyl acrylate, and very low density polyethylenes having a density of less than about 0.912 g/cm$^3$.

In some embodiments, it may be desirable to maximize the degree to which a stretch film is stretched, as expressed by the percent of elongation of the stretched film relative to the unstretched film, and termed the "stretch ratio". At relatively larger stretch ratios, the film imparts greater holding force. Further, films which can be used at larger stretch ratios with adequate holding force and film strength offer economic advantages, since less film is required for packaging or bundling.

The application of polyethylene films in stretch wrapping has been considerably enhanced by the use of linear low density polyethylene (LLDPE) type products. When formed into a film for stretch wrap application, LLDPE products typically combine a high extensibility with good mechanical properties to provide a wrapping or collation function to be achieved in an economic and effective manner. In this respect, LLDPE has significant advantages over LDPE which, due to both its behavior in extension and its mechanical performance, is not normally regarded as a product of choice for stretch wrapping applications.

In the case of a film made of a linear low density polyethylene, after wrapping, an excessive stress is likely to be exerted to a wrapped product, whereby the wrapped product or its tray is likely to be deformed, or the strength after wrapping tends to be weak, or the film tends to undergo non-uniform stretching, so that the appearance of a commercial product after wrapping tends to be poor. Some efforts to solve this problem have been to lower the density of the linear low density polyethylene, however, the resulting pellets or film tend to be excessively sticky, which causes problems during the production or handling of wrapped products after wrapping.

Application of stretch wrap films may be either by hand or by machine. The film may be either wrapped directly onto the article or articles to be packaged, or it may undergo a pre-stretching operation prior to wrapping. Pre-stretching typically enhances the mechanical property of the film and provides a more effective packaging and more efficient coverage for a given unit mass of film. Hence, the response of the film to either a pre-stretch or the stretch applied during wrapping is an important parameter affecting film performance. In particular, for a given film width and thickness the efficiency with which an object is wrapped is affected by the degree to which the film can be thinned during the stretching and the loss of film width which may occur at the same time. The resistance to sudden impact events, puncture by sharp objects and the ability to maintain a tension sufficient to maintain the package in the desired shape and configuration are also important parameters.

In some embodiments of stretch wrapping applications, the film displays a certain degree of adhesive or cling behavior enabling a film closure of the package to be achieved without resort to use of additional securing measures such as straps, glues or heat sealing operations. For monolayer films, such adhesion may be provided by the intrinsic film properties or by using a "cling" additive in the film formulation. An example of a cling additive which is widely used is poly(isobutene) (PIB) which term is taken to include polybutenes produced from mixed isomers of butene. For multi-layer films, it is relatively easy to provide one or more surface layers which are specifically formulated to provide cling. In general, this method allows a more flexible approach to film manufacture as choice of product for the main body of the film may be made on the basis of mechanical performance and the surface layers can be specially formulated for adhesion. Those skilled in the art will appreciate the multiplicity and flexibility of the choices of possible film structures.

In some stretch films, as the film is stretched a small decrease in the film thickness due to small fluctuations in thickness uniformity can result in a large fluctuation in elongation, giving rise to bands of weaker and more elongated film transverse to the direction of stretching, a defect known as "tiger striping". Thus, it is desirable to avoid tiger striping over typical thickness variations of, for example, +−0.5%. In addition, since the extent of elongation correlates inversely with the amount of film that must be used to bundle an article, it is desirable for the film to be stretchable to a large elongation. In principle the elongation at break is the maximum possible elongation. Thus, it is desirable to have a large elongation to break. Other desirable properties include, but are not limited to, high cling force and good puncture resistance.

Stretch films are often stretched at the time of use, which requires the application of force in order to stretch the film as much as 200% to properly contain a load. In many cases, stretch films are "pre-stretched" by a film converter prior to delivery to the end-user. Pre-stretched films are described as films that are taken from master rolls of film that have already been produced, stretched in a separate step, and re-wound onto film rolls for later use. Many end-users use pre-stretched films to increase the rate at which loads can be wrapped and to minimize the force required to wrap loads.

Pre-stretched films are typically made from various polyethylene polyethylenes and may be single or multilayer products. Cling additives are frequently used to ensure that adjacent layers of film will cling to each other. After the cling has fully developed, pre-stretched films are stretched in a separate operation. This process orients the molecules in the film in a longitudinal direction, parallel to the direction of the film's travel through the stretching machine. This orientation in the machine direction removes most of the stretch in the film. The resulting film is relatively stiff for its thickness and has very little residual orientation or stretch remaining before the film fails in the machine direction. These characteristics are desirable because much less effort is required to secure a load using pre-stretched film as compared to conventional handheld stretch films.

However, the pre-stretching operation may require additional material handling, dedicated converting equipment, increased warehouse space, and the manpower needed to manage the operation. Additionally, the pre-stretching can end with the film tearing or otherwise failing if it does not have sufficient strength. Film tearing or failure during pre-stretching operations results in increased film scrap and higher raw material usage, further increasing the cost and decreasing the efficiency of making pre-stretched film.

Example materials useful in some embodiments of the stretch films disclosed herein, are compositions with a melt index greater than 1.5 g/10 min (12 at 190° C.) with a density between 0.912 and 0.924 g/cc. In some embodiments of machine-applied stretch films, a high-performance end-use expectation may exist, creating a need for the use of high performance polyethylene polymers such as hexene or octene copolymers of ethylene, made for example by gas-phase polymerization or solution polymerization. The aforementioned resins have elongational properties, elastic recovery, and surface tack suitable for premium grade machine stretch films. The surface layer of a cast stretch film may have a further preference for a tacky film where a hexene copolymer, may in some embodiments, provide the benefit of a high tack surface interface.

Shrink Films

In general, shrink films can be categorized as conventional shrink films or specialized shrink films. "Conventional shrink films" are packaging films used to collate groups of articles into a unitized package for the purpose of handling, shipping, distribution and final sale. Conventional shrink films are typically manufactured using blown film processes; both monolayer and multilayer films are commonly produced. In general, conventional shrink films shrink an isotropically e.g., films may shrink 65 to 85% in the machine direction (MD) and −10 to 20% in the transverse direction (TD). Higher shrinkage in the MD is used advantageously by circumferentially wrapping articles such that the shrink film's MD direction is oriented in the circumferential wrapping direction. Non-limiting examples of articles that are frequently wrapped with conventional shrink film include: canned soup, canned fish, bottles and cans of beverages such as water, soft drinks, beer, energy drinks, liquid protein drinks and multipacks of bottles or cans. In some cases, multiple articles (e.g., 12 or 24 bottles) contained within a tray are wrapped with shrink film and after passage through a shrink tunnel a secure unitized package is produced that can be easily handled and shipped. Any suitable material may be used to construct the tray, e.g., cardboard or plastics. Rather than a tray, a case may be used to contain the multiple articles and the case shrink wrapped. In addition, loose articles may be shrink wrapped, i.e., a tray or case is not employed. In some cases, the unitized package (post-shrink state) is not completely wrapped with shrink film, i.e., the package has an open end which is not encapsulated with shrink film, e.g., the side-opening in a case of shrink wrapped bottle water. In other cases, the unitized package is completely encapsulated with shrink film. In some applications the shrink film maybe pigmented and/or printed such that a high-quality image is displayed for advertising and/or promotional purposes. Conventional shrink films benefit from the optimal selection of ethylene polymer and/or an optimal blend of the most appropriate ethylene polymers; non-limiting examples of ethylene polymers include plastomers, very-low density polyethylene (VLDPE), linear-low density polyethylene (LLDPE), medium density polyethylene (MDPE), high density polyethylene (HDPE), high pressure low density polyethylene (LDPE) and copolymers of ethylene and vinyl acetate (EVA). In this disclosure, plastomers, VLDPE, LLDPE, MDPE and HDPE are "ethylene polymers", i.e., macromolecules comprising ethylene and optionally one or more comonomers and manufactured using any catalyst or polymerization process. Conventional shrink films may have a monolayer or multilayer construction; non-limiting examples of multilayer films include films containing 2 to 11 layers where the chemical composition of each layer may be the same or different.

In addition to conventional shrink film, a second category of shrink film is specialized shrink film. "Specialized shrink films" are manufactured such that the film's shrink properties fall within specific limits; non-limiting examples of properties include MD % shrink, TD % shrink, MD shrink force, TD shrink force, film clarity or film sealability, etc. Specialized shrink films are manufactured by non-conventional techniques, non-limiting examples include doublebubble processes, the triple-bubble processes or tenter frame processes. Frequently, in the film and packaging industries, specialized shrink films are also called "biaxially oriented shrink films". A non-limiting example of a specialized shrink film is a film that shrinks about 50% in the MD and about 50% in the TD; after shrinking, such a film produces a smooth and uniform wrapping on articles of various shapes; non-limiting examples of shapes include the wrapping of square, rectangular or round consumer goods, e.g. CD cases, books, magazines, boxes, etc. Specialized shrink films may also be used to shrink wrap large items; non-limiting examples include pallets, industrial equipment, cars, or boats, etc. Specialized shrink films are also used to produce smooth and uniformly wrapped food products; non-limiting examples include cheese, red meat and poultry, etc. Specialized shrink films may have a monolayer or multilayer construction; non-limiting examples of multilayer films include films containing 2 to 11 layers. Generally, multilayer films contain chemically distinct layers that impart additional characteristics; non-limiting examples of characteristics include water vapor resistance, oxygen barrier resistance or puncture resistance.

Specialized shrink films benefit from the optimal selection of an ethylene polymer and/or an optimal blend of the most appropriate ethylene polymers; non-limiting examples include, plastomers, very-low density polyethylene (VLDPE),linear-low density polyethylene (LLDPE), medium density polyethylene(MDPE), high density polyethylene (HDPE), high pressure low density polyethylene (LDPE) and copolymers of ethylene and vinyl acetate (EVA) .Typically, in specialized shrink films, high pressure LDPE is used less frequently or in lower concentrations relative to conventional shrink films. A variety of processes can be used to apply a specialized shrink film to the article to be wrapped and to heat/shrink wrap the film around the article(s); non-limiting examples of the latter include a heated shrink tunnel, hot water bath, steam bath, etc.

Example compositions for some embodiments of collation shrink film applications include fractional melt index low density polythylene (LDPE) of <1 g/10 min (12 at 190° C.) and linear molecule (Zeigler-Natta (Z/N) or single site catalyst (SSC) or combination thereof) materials such as LLDPE to HDPE with densities ranging from 0.913 to 0.967 g/cc. In some embodiment, these materials offer high shrink force for load retention, good optical properties and mid-range strength and toughness.

Vacuum Packing

Vacuum packing is a method of packaging that removes air from the package prior to sealing. This method involves (manually or automatically) placing items in a plastic film package, removing air from inside, and sealing the package. One intent of vacuum packing is to remove oxygen from the container to extend the shelf life of foods in such package. Toys—especially those having multiple parts—can also be packaged in vacuum packaging to reduce the damage to the surface finish that can occur during shipping and handling. It is becoming more important to reduce wasted free-volume in packaging when shipping goods.

For vacuum packaging (for example for shipping goods) one example material is an LLDPE or MDPE material having a melt index between 0.3 and 3 and a density of between 0.913 g/cc and 0.940 g/cc). in some embodiments, the LLDPE is protected from thermal degradation by a combination of modern antioxidants which in effect limit the opportunity for further degradation during extrusion processing with the secondary recycled feedstock. The LLDPE or MDPE material is capable of mixing or blending with partially degraded or crosslinked reprocessed recycled polyethylene.

Dunnage Film

Dunnage bags, also known as airbags, air cushions, and inflatable bags, are used to secure and stabilize cargo. Dunnage bags should resist slow puncture when in contact with sharp objects and should damp and absorb high forces exerted during transit, thereby protecting and stabilizing layers of goods. Dunnage bags provide convenient and cost-effective cargo stabilization in sea containers, closed railcars, trucks, and oceangoing vessels. As improperly secured cargo is a safety hazard, dunnage bags improve road safety.

Example compositions useful for dunnage film applications, are LLDPE, sLLDPE or MDPE resins with a melt index between 0.3 and 3 g/10 min and a density between 0.912 and 0.930 g/cc. In some embodiments, lower density high toughness LLDPE or sLLDPE of 0.912 to 0.916 g/cc may be suitable. In some embodiments, the selection of a lower density virgin LLDPE or sLLDPE may allow the composite density to be appropriately adjusted after the virgin polyethylene has been blended with the recycled polyethylene, which is expected to have a range of densities depending on source options. In some embodiments, the virgin resin serves as a modifier or optimizer to offset potential mechanical property deficiencies that can be introduced by the blending of recycled polyethylene into the dunnage film formulation.

Synthetic Lumber

Uses up to 100% post-consumer and post-industrial plastic to create a variety of recycled plastic products that are used in industrial, agricultural and residential applications, i.e., pallets, bed liners, landscaping, park benches, nailer boards, bollard posts, parking curbs, manure spreader liners, industrial crating, plastic lumber, fence boards, fence posts, tongue & groove, and insert beams.

EXAMPLES

Test Methods
Density: Densities were determined using ASTM D792-13 (Nov. 1, 2013).
MI: Melt index was determined using ASTM D1238 (Aug. 1, 2013). Melt indexes, $I_2$, $I_6$, $I_{10}$ and $I_{21}$ were measured at 190° C., using weights of 2.16 kg, 6.48 kg, 10 kg and a 21.6 kg respectively. "Stress exponent" or its acronym "S.Ex.", is defined by the following relationship:

$$S.Ex.=\log(I_6/I_2)/\log(6480/2160)$$

wherein $I_6$ and $I_2$ are the melt flow rates measured at 190° C. using 6.48 kg and 2.16 kg loads, respectively.
Gloucester Film Line: 100 lb/hr output; 15" FLH; 7C cooling setting (blower); 30 psi nip pressure; 100 mils die gap; 16 ft/min speed; 32 amps current; 152 volts voltage; 2300 psi pressure; 31 rpm screw speed; 2.5:1 BUR; 15.7 layflat; 8 mil thickness; LP die; 4" die diameter; Western Polymer air ring; 20/40/60/80/20 screen pack; barrier screw.
Differential Scanning Calorimetry: was conducted with a sample weight of 5 to 10 mg; heating rate of 10° C./min; a hold time of 10 minutes; a scan range of 0° to 200° C. according to ASTM D3418
Rheological Capillary Viscosity: Rheological Capillary Viscosity Test; Instrument: Dynisco LCR7000; Die diameter: 0.060"; Die length: 1.2"; L/D: 20:1; Test Temperature: 200° C.

DMA: Oscillatory shear measurements under small strain amplitudes were carried out to obtain linear viscoelastic functions at 190° C. under $N_2$ atmosphere, at a strain amplitude of 10% and over a frequency range of 0.02-126 rad/s at 5 points per decade. Frequency sweep experiments were performed with a TA Instruments DHR3 stress-controlled rheometer using cone-plate geometry with a cone angle of 5°, a truncation of 137 μm and a diameter of 25 mm. In this experiment a sinusoidal strain wave was applied and the stress response was analyzed in terms of linear viscoelastic functions. The zero shear rate viscosity (η0) based on the DMA frequency sweep results was predicted by Ellis model (see R. B. Bird et al. "Dynamics of Polymer Liquids. Volume 1: Fluid Mechanics" Wiley-Interscience Publications (1987) p. 228) or Carreau-Yasuda model (see K. Yasuda (1979) PhD Thesis, IT Cambridge). In this disclosure, the LCBF (Long Chain Branching Factor) was determined using the DMA determined η0.

Gel Camera: OCS GmbH; Wullener Feld 24, 58545 Witten, Germany; following gel sizes were observed: 250, 500, 750, 1000, 1500 and 2000 μm.

sured using a conventional Instron tensile tester equipped with a 200 lbf load cell. Strips of monolayer film samples were cut for testing with following dimensions: 14 inch long, 1 inch wide and 1 mil thick; ensuring that there were no nicks or cuts on the edges of the samples. Film samples were cut in both the machine direction (MD) and the transverse direction (TD) and tested. ASTM conditions were used to condition the samples. The thickness of each film was measured with a hand-held micrometer. Samples were loaded in the Instron with a grip separation of 10 inch and pulled at a rate of 1 inch/min generating the strain-strain curve. The 1% and 2% secant modulus were calculated using the INSTRON® software.

Film Elmendorf Tear: Film tear performance was determined by ASTM D1922-09 (May 1, 2009); an equivalent term for tear is "Elmendorf tear". Film tear was measured in both the machine direction (MD) and the transverse direction (TD) of the blown films.

Film Opticals: Film optical properties were measured as follows: Haze, ASTM D1003-13 (Nov. 15, 2013), and; Gloss ASTM D2457-13 (Apr. 1, 2013).

| Parcel length | 499.75 [mm] | Ø Grey value | 149 | Ø Film thickness | _,_ [μm] |
|---|---|---|---|---|---|
| Parcel width | 370.75 [mm] | Mean filter size | 26 (26) | Ø Defect size | 367.59 [μm] |
| Parcel area | 0.185 [m²] | Ø Film speed | 40.08 [m/min] | Ø Defect area | 0.121 [mm²] |
| Inspected parcels | 1080 (1080) | Ø Exposure time | 0.138 [ms] | Total defect area | 85.512 [mm²] |
| Inspected area | 200.070 [m²] | Ø Transp./noise | 406.61 [%]/1.44 [%] | Total defect PPM | 0.427 |
| Inspected length | 539.730 [m] | X resolution | 250 [μm] | Y resolution | 250 [μm] |
| Start time | Apr. 18, 2019 9:58:49 AM | Stop time | Apr. 18, 2019 10:12:17 AM | Duration | 0:13:28 |
| Levels | 60 40 80 30 | | | | |

Dart: Film dart impact strength was determined using ASTM D1709-09 Method A (May 1, 2009). The dart impact test employed a 1.5 inch (38 mm) diameter hemispherical headed dart. Dart method B (ASTM D1709-09, Method B) was used for the dunnage film.

Film Tensile: The following film tensile properties were determined using ASTM D882-12 (Aug. 1, 2012): tensile break strength (MPa), elongation at break (%), tensile yield strength (MPa), tensile elongation at yield (%) and film toughness or total energy to break (ft.lb/in³). Tensile properties were measured in the both the machine direction (MD) and the transverse direction (TD) of the blown films.

Film Secant Modulus: Secant moduli were determined according to ASTM D882. The secant modulus is the slope of a line drawn between two points on the stress-strain curve, i.e. the secant line. The first point on the stress-strain curve is the origin, i.e. the point that corresponds to the origin (the point of zero percent strain and zero stress), and; the second point on the stress-strain curve is the point that corresponds to a strain of 1%; given these two points the 1% secant modulus is calculated and is expressed in terms of force per unit area (MPa). The 2% secant modulus is calculated similarly. This method was used to calculated film modulus because the stress-strain relationship of polyethylene does not follow Hook's law. Secant moduli were mea- Materials List:

| Resin | Density g/cc | MI g/10 minutes | Comonomer | Process | Catalyst |
|---|---|---|---|---|---|
| LLDPE-1 | 0.920 | 2.35 | Octene | Solution | Z/N |
| LLDPE-2 | 0.918 | 2 | Hexene | Gas Phase | Z/N |
| LLDPE-3 | 0.919 | 0.85 | Octene | Solution | SSC + Z/N |
| HDPE-1 | 0.9575 | 0.95 | Homopolymer | Solution | Z/N |
| LLDPE-4 | 0.920 | 0.25 | Homopolymer | Gas Phase | Z/N |
| LLDPE-5 | 0.914 | 0.85 | Octene | Solution | SSC + Z/N |

"AB" is a masterbatch (blend) of 80% polyethylene and 20% "antiblock" additive. The antiblock is diatomaceous earth. "$TiO_2$" is a blend/masterbatch of a colorant (titanium dioxide) that is dispersed in polyethylene.

Converting Virgin LLDPE-1 to Recycled Polyethylene (Multi-Pass Study)

LLDPE-1 was melted/in a single screw extruder at 410° F. A total of eight extrusions were conducted.

After each extrusion pass, material was collected, blown and tested for both physical properties and polyethylene characterization.

The extent of degradation was analyzed with the following tests: shifts in melting points in the DSC, shifts in shear viscosity at low frequencies (as this is a proxy for processability of the polyethylene); gels (as this would result in visual physical defects to the film); and, lastly, oxidation or degradation of the phosphite (secondary antioxidant).

Figure 1:
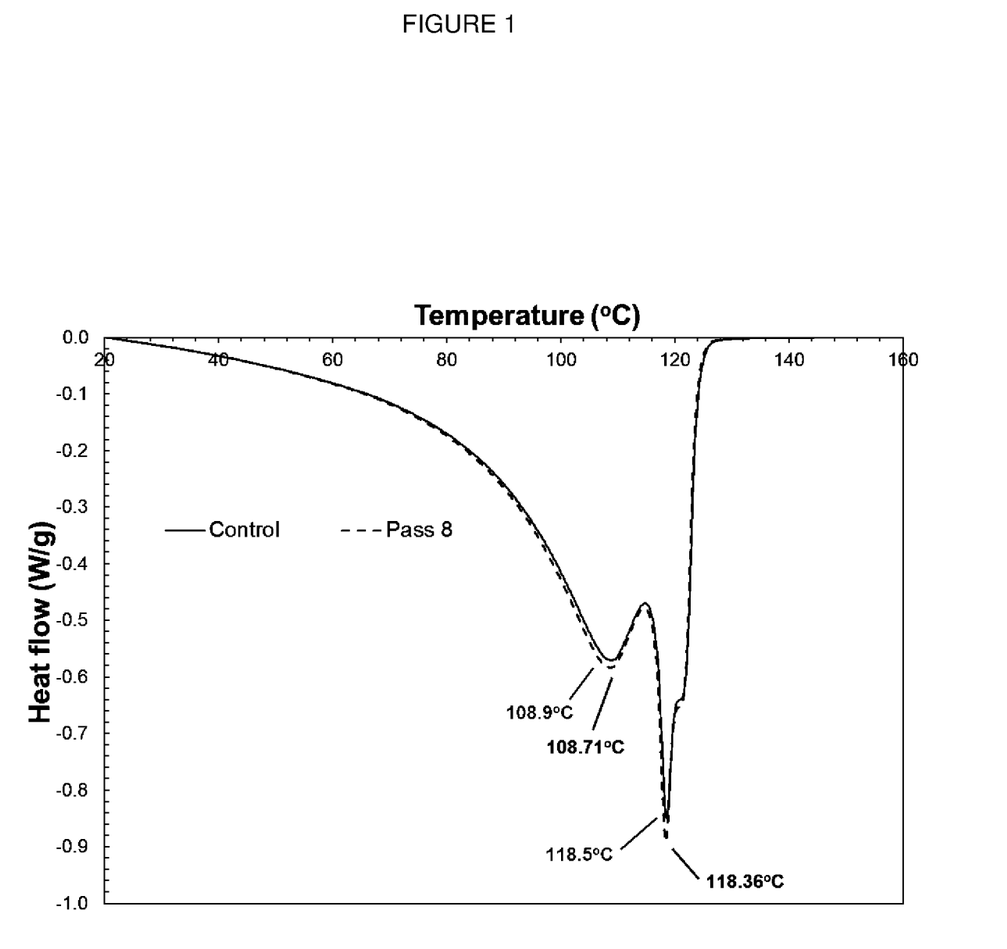
FIG. 1 is the Differential Scanning Calorimetry (DSC) melting points for the control versus pass 8 of LLDPE-1.

The Differential Scanning Calorimetry (DSC) curves for the "virgin" LLDPE-1 and the recycled LLDPE-1 (subjected to eight passes through the extruder at 410° F.) are shown in FIG. 1. The recycled LLDPE-1 does not show any indication of excessive degradation according to the DSC data.

Figure 2:
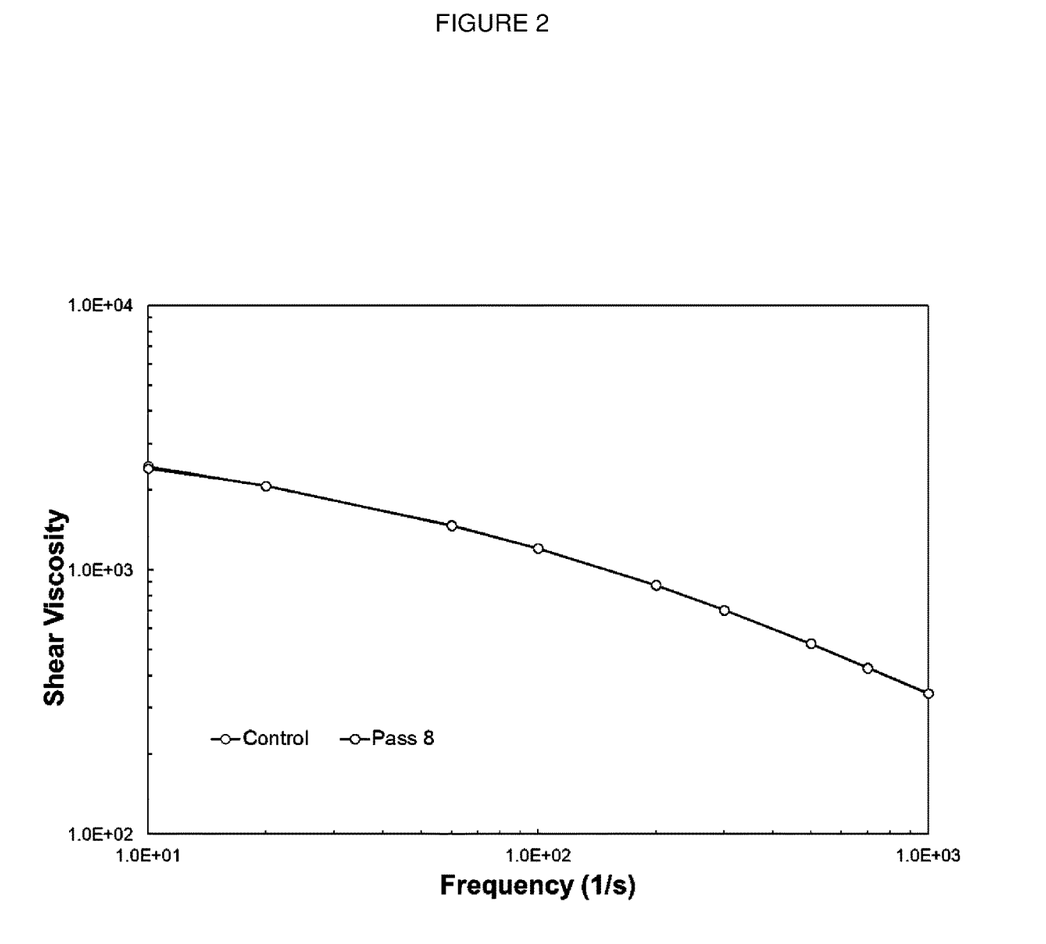
FIG. 2 is the shear viscosity versus shear rate was measured for the virgin versus recycled LLDPE-1.

Shear viscosity data for the virgin (control) and recycled LLDPE-1 are shown in FIG. 2. Again, there is no evidence of excessive degradation in the recycled LLDPE-1 (i.e. LLDPE-1, after 8 extrusion passes).

Antioxidant Consumption and Gels:

|  | Virgin | Recycled |
|---|---|---|
| Phosphite Active (ppm) | 1234 | 2189 |
| Phosphite Degraded (ppm) | 0 | 24 |
| Total Gels (ppm) | 0.427 | 0.302 |

The above data show that 24 ppm of the phosphite ("secondary") antioxidant was oxidized (consumed) but the total gels observed in the films are similar.

Table 1 below shows how the film physicals maintain their performance, after the 8 heat histories. The properties that showed a change include gloss and haze. Gloss declined from 56 to 35 and haze increased from 9 to 17%.

TABLE 1

Physical Properties Measured on Blown Film for the Control Sample and Pass 8

|  | Virgin | Recycled |
|---|---|---|
| Density (g/cc) | 0.920 | 0.920 |
| MI | 2.35 | 2.41 |
| MD Secant (MPa) | 198 | 190 |
| MD Tear (g/mil) | 341 | 304 |
| Dart (g) | 148 | 134 |
| MD Tensile Strength (MPa) | 49 | 51 |
| TD Tensile Yield (MPa) | 10 | 10 |
| % Tensile Elongation | 533 | 578 |
| Gloss 45 | 56 | 35 |
| Haze (%) | 9 | 17 |

Examples Using Recycled LLDPE-1 to Prepare Film

The recycled polyethylene materials made in example 1 were used to prepare films in the following examples.

In Example 1, LLDPE-1 had a total of 5 "lives". The first as 100% virgin and the subsequent four as continuously repurposed. At lives 2 (has observed 3 heat histories or passes), 3 (has observed 5 heat histories or passes) and 4 (has observed 7 heat histories or passes), 50% of the "stressed" polyethylene was blended with 50% virgin polyethylene to make high performance films for the following applications: vacuum pack, collation shrink and dunnage film. Density, MI, film physicals, antioxidant levels and gels were observed for all products and reported below.

Example 2: Vacuum Pack (3 mil)

The vacuum pack film was prepared on a blown film line that was equipped with an extruder (having a diameter of 2.5 inches) and a circular die (having a diameter of 4 inches). The width of the die gap was 100 mils. The Blow Up Ratio ("BUR") aiming point was 2.5:1.

|  | Product 2 (Pass 3) | Product 3 (Pass 5) | Product 4 (Pass 7) |
|---|---|---|---|
| Density (g/cc) | 0.929 | 0.929 | 0.929 |
| MI | 1.45 | 1.45 | 1.45 |
| MD Secant (MPa) | 288 | 288 | 281 |
| MD Tear (g/mil) | 329 | 305 | 317 |
| Dart (g/mil) | 102 | 120 | 114 |
| MD Tensile Strength (MPa) | 31 | 35 | 35 |
| TD Tensile Yield (MPa) | 16 | 16 | 15 |
| % Tensile Elongation | 838 | 884 | 880 |
| Gloss 45 | 37 | 34 | 36 |
| Haze (%) | 101 | 101 | 101 |
| I168 Degraded (ppm) | 81 | 105 | 119 |
| Total Gels (ppm) |  |  |  |

Product 2: 50% LLDPE-1-A Pass 3/22% LLDPE-3/20% HDPE-1/2% | AB/6% | TiO$_2$ White MB
Product 3: 50% LLDPE-1-A Pass 5/22% LLDPE-3/20% HDPE-1/2% | AB/6% | TiO$_2$ White MB
Product 5: 50% LLDPE-1-A Pass 7/22% LLDPE-3/20% HDPE-1/2% | AB/6% | TiO$_2$ White MB

Example 3: Recycled Polyethylene in Shrink Film

Shrink (2.5 mil)

The shrink film was prepared on a blown film line that was equipped with an extruder (having a diameter of 2.5 inches) and a circular die (having a diameter of 4 inches). The width of the die gap was 100 mils. The Blow Up Ratio ("BUR") aiming point was 2.5:1.

|  | Product 2 (Pass 3) | Product 3 (Pass 5) | Product 4 (Pass 7) |
|---|---|---|---|
| Density (g/cc) | 0.930 | 0.930 | 0.930 |
| MI | 1.3 | 1.3 | 1.3 |
| MD Secant (MPa) | 266 | 263 | 292 |
| MD Tear (g/mil) | 55 | 55 | 55 |
| Dart (g/mil) | 40 | 43 | 41 |
| MD Tensile Strength (MPa) | 27 | 27 | 28 |
| TD Tensile Yield (MPa) | 15 | 15 | 17 |
| % Tensile Elongation | 590 | 598 | 602 |
| Gloss 45 | 33 | 35 | 34 |
| Haze (%) | 25 | 24 | 24 |
| Phosphite Degraded (ppm) | 90 | 148 | 88 |
| Total Gels (ppm) |  |  |  |

Product 2: 50% LLDPE-1-A Pass 3/28% LLDPE-4/20% HDPE-1/2% | AB
Product 3: 50% LLDPE-1-A Pass 5/28% LLDPE-4/20% HDPE-1/2% | AB
Product 4: 50% LLDPE-1-A Pass 7/28% LLDPE-4/20% HDPE-1/2% | AB

Example 4: Recycled Polyethylene in Dunnage Film

Dunnage Film (8 mil)

The dunnage film was prepared on a blown film line that was equipped with an extruder (having a diameter of 2.5 inches) and a circular die (having a diameter of 4 inches). The width of the die gap was 100 mils. The Blow Up Ratio ("BUR") aiming point was 2.5:1.

|  | Product 2 (Pass 3) | Product 3 (Pass 5) | Product 4 (Pass 7) |
|---|---|---|---|
| Density (g/cc) | 0.917 | 0.917 | 0.917 |
| MI | 1.43 | 1.43 | 1.43 |
| MD Secant (MPa) | 172 | 158 | 167 |
| MD Tear (g/mil) | 532 | 537 | 544 |
| Dart Method "B" (g/mil) | 213 | 207 | 207 |
| MD Tensile Strength (MPa) | 38 | 30 | 33 |
| TD Tensile Yield (MPa) | 10 | 10 | 10 |
| % Tensile Elongation | 1065 | 940 | 985 |

-continued

|  | Product 2 (Pass 3) | Product 3 (Pass 5) | Product 4 (Pass 7) |
|---|---|---|---|
| Gloss 45 | 47 | 46 | 46 |
| Haze (%) | 101 | 101 | 101 |
| Phosphite Degraded (ppm) | 66 | 74 | 81 |
| Total Gels (ppm) |  |  |  |

Product 2: 50% LLDPE-1-A Pass 3/42% LLDPE-5/2% | AB/6% | TiO$_2$ White MB
Product 3: 50% LLDPE-1-A Pass 5/42% LLDPE-5/2% | AB/6% | TiO$_2$ White MB
Product 4: 50% LLDPE-1-A Pass 7/42% LLDPE-5/2% | AB/6% | TiO$_2$ White MB Example 5: Stretch Film The stretch film was prepared on a three layer cast film line (relative thickness of layers=10/80/10; i.e. each external or "skin" layer was 10% of total film thickness). The line was equipped with an extruder having a 3.5 inch core and a slot die having a width of 30 inches.

The stretch film was prepared in three layers (in the 10/80/10 ratio described above). The core layer was made of the "recycled" LLDPE-1 that was generated in the first example. The skin layers were made with LLDPE-2. (In an embodiment, the core may be prepared with recycled polyethylene and the skins may be prepared with virgin polyethylene.)

SOME EXAMPLE EMBODIMENTS FOLLOW

Embodiment 1: A stretch film made form a blend comprising from 20 to 80 weight % polyethylene and 80 to 20 weight % of recycled polyethylene.
Embodiment 2: The stretch film of embodiment 1, further characterized by having at least three layers including two skin layers and at least one core layer.
Embodiment 3: The stretch film of embodiment 1 wherein said at least one core layer comprises at least 70 weight % recycled polyethylene.
Embodiment 4: A process to prepare a stretch film comprising:
1) preparing a blend of from 20 to 80 weight % polyethylene and from 80 to 20 weight % recycled polyethylene, and
2) converting said blend to said stretch film in a cast film process.
Embodiment 5: A shrink film made form a blend comprising from 20 to 80 weight % polyethylene and 80 to 20 weight % of recycled polyethylene.
Embodiment 6: The shrink film of embodiment 1, further characterized by having at least three layers including two skin layers and at least one core layer.
Embodiment 7: The shrink film of embodiment) wherein said at least one core layer comprises at least 70 weight % recycled polyethylene.
Embodiment 8: A process to prepare a shrink film comprising:
1) preparing a blend of from 20 to 80 weight % polyethylene and from 80 to 20 weight % recycled polyethylene, and
2) converting said blend to said shrink film in a blown film process.
Embodiment 9: A dunnage film made form a blend comprising from 20 to 80 weight % polyethylene and 80 to 20 weight % of recycled polyethylene.
Embodiment 10: The dunnage film of embodiment 1, further characterized by having at least three layers including two skin layers and at least one core layer.
Embodiment 11: The dunnage film of embodiment 1 wherein said at least one core layer comprises at least 70 weight % recycled polyethylene.
Embodiment 12: A process to prepare a dunnage film comprising:
1) preparing a blend of from 20 to 80 weight % polyethylene and from 80 to 20 weight % recycled polyethylene, and
2) converting said blend to said dunnage film in a blown film process.
Embodiment 13: A vacuum packaging film made form a blend comprising from 20 to 80 weight % polyethylene and 80 to 20 weight % of recycled polyethylene.
Embodiment 14: The vacuum packaging film of embodiment 1, further characterized by having at least three layers including two skin layers and at least one core layer.
Embodiment 15: The vacuum packaging film of embodiment 1 wherein said at least one core layer comprises at least 70 weight % recycled polyethylene.
Embodiment 16: A process to prepare a vacuum packaging film comprising:
1) preparing a blend of from 20 to 80 weight % polyethylene and from 80 to 20 weight % recycled polyethylene, and
2) converting said blend to said vacuum packaging film in a blown film process.

INDUSTRIAL APPLICABILITY

The present technology is suitable use in a wide variety of packaging applications, including films for food packaging and films for wrapping consumer and/or commercial goods

The invention claimed is:

1. A film made from a composition comprising from 95 to 10 weight % virgin polyethylene and 5 to 90 weight % of recycled polyethylene, wherein the virgin polyethylene consists of or a virgin medium density polyethylene having a density of 0.926 to 0.940 g/cm$^3$, wherein density is determined using ASTM D792-13, and wherein the film is a stretch film, shrink film, dunnage film, or vacuum packaging film.

2. The film of claim 1, wherein the composition comprises from 20 to 80 weight % virgin polyethylene and 80 to 20 weight % of recycled polyethylene.

3. The film of claim 1, wherein the composition comprises from 95 to 80 weight % virgin polyethylene and 5 to 20 weight % of recycled polyethylene.

4. The film of claim 1, further characterized by having at least three layers.

5. The film of claim 1, further characterized by having at least five layers.

6. The film of claim 1, further characterized by having at least seven layers.

7. The film of claim 1, further characterized by having at least three layers including two skin layers and at least one core layer.

8. The film of claim 7 wherein said at least one core layer comprises at least 70 weight % recycled polyethylene.

9. The film of claim 1, where in the density of the recycled polyethylene is from 0.88 to 0.97 grams per cubic centimeter.

10. The film of claim 1, wherein virgin polyethylene has a melt index, $I_2$, of from 0.3 to 30 grams/10 minutes as determined using ASTM D1238, measured at 190° C., using a weight of 2.16 kg.

11. The film of claim 1, wherein the recycled polyethylene is a polyethylene that has seen at least 3 heat histories.

12. The film of claim 1, wherein the recycled polyethylene is a polyethylene that has seen at least 5 heat histories.

13. The film of claim 1, wherein the recycled polyethylene is a polyethylene that has seen at least 7 heat histories.

14. The film of claim 1, wherein the composition further comprises an additive selected from the group consisting of an antioxidant, slip agent, anti-static agent, impact modifier, colorant, acid scavenger, processing aid component, melt stabilizer, nucleating agent, and a mixture of any two or more thereof.

15. A process to prepare a stretch film comprising:
1) Preparing a composition comprising from 95 to 10 weight % virgin polyethylene and 5 to 90 weight % of recycled polyethylene, and
2) converting the composition to said stretch film in a cast film process;
wherein the virgin polyethylene consists of or a virgin medium density polyethylene having a density of 0.926 to 0.940 g/cm$^3$, wherein density is determined using ASTM D792-13.

16. The process of claim 15, wherein the composition comprises from 20 to 80 weight % virgin polyethylene and 80 to 20 weight % of recycled polyethylene.

17. The process of claim 15, wherein the composition comprises from 95 to 80 weight % virgin polyethylene and 5 to 20 weight % of recycled polyethylene.

18. The process of claim 15, wherein the density of the recycled polyethylene is from 0.88 to 0.97 grams per cubic centimeter.

19. The process of claim 15, wherein polyethylene has a melt index, $I_2$, of from 0.3 to 30 grams/10 minutes.

20. The process of claim 15, wherein the recycled polyethylene is a polyethylene that has seen at least 3 heat histories.

21. The process of claim 15, wherein the recycled polyethylene is a polyethylene that has seen at least 5 heat histories.

22. The process of claim 15, wherein the recycled polyethylene is a polyethylene that has seen at least 7 heat histories.

23. A process to prepare a shrink film comprising:
1) Preparing a composition comprising from 95 to 10 weight % virgin polyethylene and 5 to 90 weight % of recycled polyethylene, and
2) converting the blend to said shrink film in a blown film process;
wherein the virgin polyethylene consists of or a virgin medium density polyethylene having a density of 0.926 to 0.940 g/cm$^3$, wherein density is determined using ASTM D792-13.

24. A process to prepare a dunnage film comprising:
1) Preparing a composition comprising from 95 to 10 weight % virgin polyethylene and 5 to 90 weight % of recycled polyethylene, and
2) converting said blend to said dunnage film in a blown film process;
wherein the virgin polyethylene consists of or a virgin medium density polyethylene having a density of 0.926 to 0.940 g/cm$^3$, wherein density is determined using ASTM D792-13.

25. A process to prepare a vacuum packaging film comprising:
1) Preparing a composition comprising from 95 to 10 weight % virgin polyethylene and 5 to 90 weight % of recycled polyethylene, and
2) Converting said blend to said vacuum packaging film in a blown film process;
wherein the virgin polyethylene consists of or a virgin medium density polyethylene having a density of 0.926 to 0.940 g/cm$^3$, wherein density is determined using ASTM D792-13.

* * * * *